United States Patent
Karaoguz et al.

(10) Patent No.: US 7,929,486 B2
(45) Date of Patent: Apr. 19, 2011

(54) PROGRAMMABLE WIRELESS ACCESS POINT SUPPORTING CONFIGURATION PROFILE UPDATING

(75) Inventors: Jeyhan Karaoguz, Irvine, CA (US); James D. Bennett, Prague (CZ)

(73) Assignee: Broadcom Corporation, Irvine, CA (US)

(*) Notice: Subject to any disclaimer, the term of this patent is extended or adjusted under 35 U.S.C. 154(b) by 1190 days.

(21) Appl. No.: 11/423,049

(22) Filed: Jun. 8, 2006

(65) Prior Publication Data
US 2007/0115950 A1   May 24, 2007

Related U.S. Application Data

(60) Provisional application No. 60/739,632, filed on Nov. 22, 2005.

(51) Int. Cl.
*H04Q 7/00* (2006.01)

(52) U.S. Cl. ..... 370/328; 370/338; 370/310; 455/426.1; 709/227

(58) Field of Classification Search ............ 370/328, 370/338, 310; 455/426, 1, 426.1; 709/227, 709/229
See application file for complete search history.

(56) References Cited

U.S. PATENT DOCUMENTS

| 7,155,517 | B1 * | 12/2006 | Koponen et al. | 709/227 |
| 7,430,604 | B2 * | 9/2008 | Balogh | 709/229 |
| 2004/0203593 | A1 * | 10/2004 | Whelan et al. | 455/411 |

* cited by examiner

*Primary Examiner* — Danh C Le
(74) *Attorney, Agent, or Firm* — McAndrews, Held & Malloy, Ltd.

(57) ABSTRACT

A system and method in a wireless communication network access point for configuring operation of the access point. Various aspects of the present invention may comprise determining communication configuration information desired for the access point. Communication configuration information may, for example, correspond to a particular communication protocol. Communication configuration information may, for example and without limitation, comprise information selecting one or more particular modules or specifying operation of one or more modules. Communication configuration information may, for example, comprise executable code. Desired communication configuration information may, for example, be determined through communication with a user or other networked device. Determined communication configuration information may then be acquired (e.g., from a networked server or other device). Such acquisition may, for example, comprise receiving solicited or unsolicited communication configuration information. The access point may then be configured in accordance with the acquired communication configuration information.

34 Claims, 4 Drawing Sheets

PROGRAMMABLE WIRELESS ACCESS POINT SUPPORTING CONFIGURATION PROFILE UPDATING

CROSS-REFERENCE TO RELATED APPLICATIONS/INCORPORATION BY REFERENCE

The present application is related to and claims priority from U.S. Provisional Patent Application Ser. No. 60/739,632, filed Nov. 22, 2005, and titled "PROGRAMMABLE WIRELESS ACCESS POINT SUPPORTING CONFIGURATION PROFILE UPDATING," the contents of which are hereby incorporated herein by reference in their entirety.

This application is also related to U.S. patent application Ser. No. 11/217,645, filed Sep. 1, 2005, titled "MULTI-MODE MOBILE COMMUNICATION DEVICE WITH WIRELESS UPDATE CAPABILITY," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Wireless communication networks are continually increasing in popularity. Such wireless communication networks might include, for example and without limitation, cellular telephone networks, a variety of types of wireless computer networks, paging networks, wireless email networks, etc. Wireless communication networks provide users of wireless communication devices the capability to conveniently conduct communications while moving through a variety of environments.

Wireless communication networks may include access points through which wireless communication devices communicatively couple to the wireless communication network. Such access points may operate in accordance with a communication mode. For example an access point may be adapted to operate in any of a variety of cellular communication modes or wireless computer network communication modes. Such an access point may, for example, operate in a particular communication configuration corresponding to a particular communication mode.

A variety of wireless communication devices might desire to communicatively couple to the communication network through a particular access point. Such wireless communication devices may be adapted to communicate utilizing one or more respective communication modes. However, the particular access point might, in various instances, not be able to operate in a manner commensurate with communication in a particular communication mode.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a wireless communication network access point for configuring operation of the access point, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
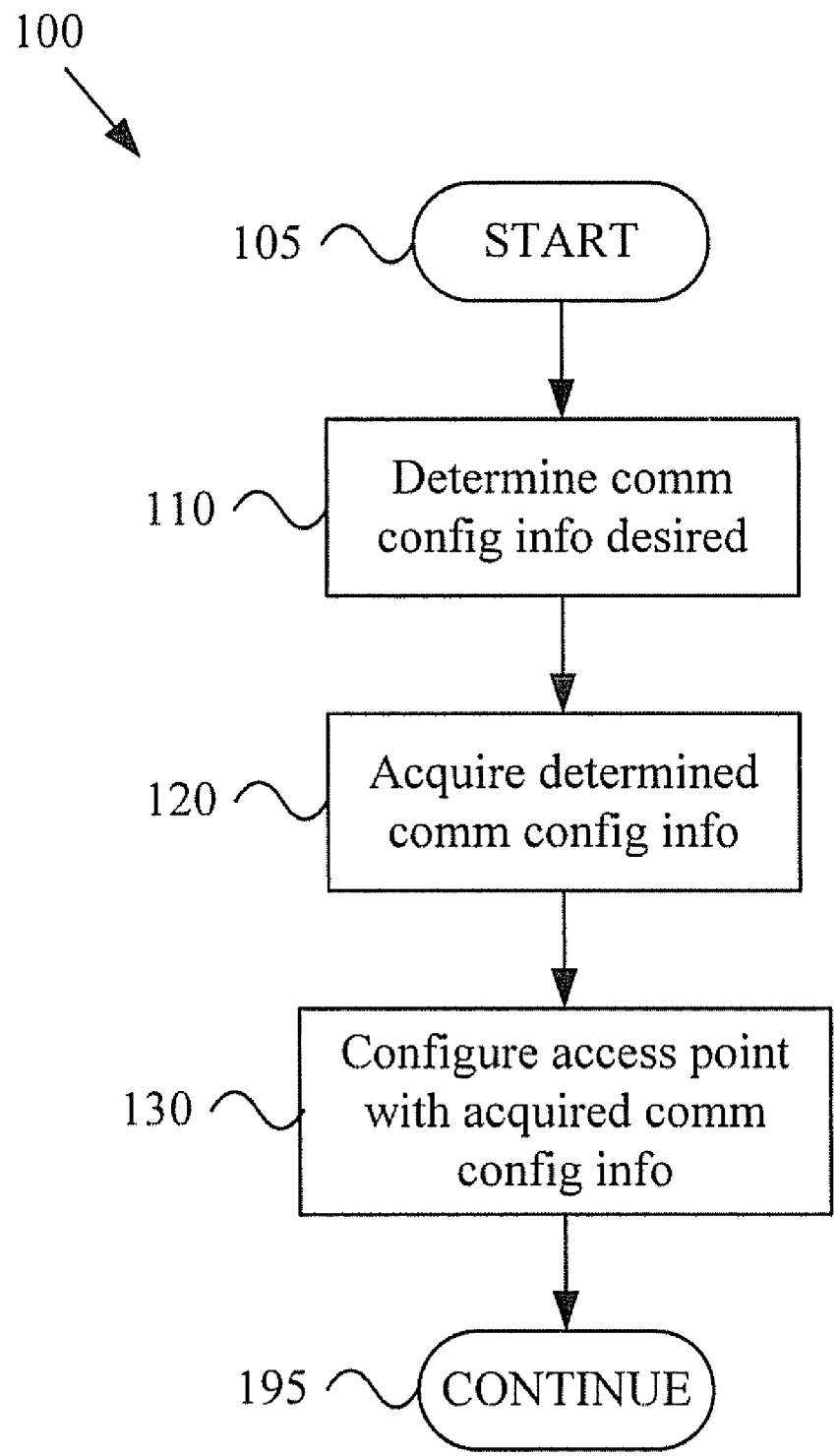
FIG. 1 is a diagram illustrating a method, in a wireless communication network access point, for configuring operation of the access point, in accordance with various aspects of the present invention.

FIG. 1 is a diagram illustrating a method 100, in a wireless communication network access point, for configuring operation of the access point, in accordance with various aspects of the present invention. The access point may comprise characteristics of an access point associated with any of a variety of types of wireless communication networks. For example and without limitation, the access point may comprise characteristics of an access point associated with a wireless computer network (e.g., WLAN, WPAN, WWAN, WMAN, Bluetooth, IEEE 802.11, UWB, IEEE 802.15, IEEE 802.16, etc.), cellular telecommunication network (e.g., GSM/GPRS/EDGE, CDMA/WCDMA/UMTS, TDMA/PDC, etc.), paging network, portable email device network, television network, satellite communication network, etc. Accordingly, the scope of various aspects of the present invention should not be limited by characteristics of any particular type of wireless communication network access point.

The exemplary method 100 may begin at step 105. The exemplary method 100 may begin executing for any of a variety of reasons. For example and without limitation, the exemplary method 100 may begin executing in response to a user command to begin. Also for example, the exemplary method 100 may begin executing in response to a signal received from another communication system. Further for example, the exemplary method 100 may begin executing in response to detected operating conditions (e.g., inoperability of various communication modes). Also for example, the exemplary method 100 may begin executing in response to a detected geographical location (e.g., at which an access point has been installed), which may be significant from a communication configuration perspective (e.g., for one or more communication modes of which the access point is generally capability of communicating with). Accordingly, the scope of various aspects of the present invention should not be limited by characteristics of any particular initiating causes or conditions.

The exemplary method 100 may, at step 110, comprise determining communication configuration information desired for the access point. Various characteristics of such communication configuration information will be discussed below.

A wireless communication network access point may be adapted to communicate in one or more communication modes. For example and without limitation, an access point may be capable of communicating in a cellular telephony communication mode. Also for example, an access point may be capable of communicating in any of a variety of computer (or data) network communication modes. Further for example, an access point may be capable of communicating in a television communication mode.

Such computer network communication mode(s) may, for example, comprise characteristics of an Internet communication mode, a Wireless Local Area Network (WLAN) communication mode, a Wireless Personal Area Network (WPAN) communication mode, a Wireless Metropolitan Area Network (WMAN) communication mode, etc. For example and without limitation, a computer communication mode may comprise characteristics of a Bluetooth mode, IEEE 802.11 mode, IEEE 802.15 mode, WiFi mode, UWB mode, IEEE 802.16 mode, etc.

For example and without limitation, a first communication mode may correspond to a first radio of an access point, and a second communication mode may correspond to a second radio of the access point. Also for example, a first communication mode may correspond to a first communication port of an access point, and a second communication mode may correspond to a second communication port of the access point. Further for example, a first communication mode may correspond to a first physical layer of an access point, and a second communication mode may correspond to a second physical layer of the access point. Still further for example, a first communication mode may correspond to a first Media Access and Control (MAC) layer of an access point, and a second communication mode may correspond to a second MAC layer of the access point. Still further for example, a first communication mode may correspond to a first communication signal path through an access point, and a second communication mode may correspond to a second communication signal path through the access point.

In a non-limiting exemplary scenario, a first communication mode may comprise a cellular telephone communication mode, a second communication mode may comprise a wireless LAN communication mode, a third communication mode may comprise a wireless MAN communication mode, and a fourth communication mode may comprise a wireless PAN communication mode. In another non-limiting exemplary scenario, a first communication mode may correspond to a relatively older version of a standard communication protocol, and a second communication mode may correspond to a relatively newer version of the standard communication protocol.

The scope of various aspects of the present invention should not be limited by characteristics of one or more particular communication modes in which an access point is capable of communicating.

An access point may be configurable (e.g., programmable) for operation in one or more communication modes. Such configuration may, for example, be characterized by a selected set of communication signal processing modules to utilize to process a communication signal. Such signal processing modules may generally comprise radio signal processing or data processing modules. Such configuration may also, for example, be characterized by the manner in which a module (e.g., hardware and/or software module) of the access point operates. Such configuration may further, for example, be characterized by particular software code that is executed to process a communication signal.

Such configuration may additionally, for example, correspond to various filter performance characteristics (e.g., noise characteristics, bandpass or bandstop characteristics, attenuation level, center frequency, corner frequency, etc.). Such configuration may also, for example, correspond to various A/D converter characteristics (e.g., temporal or sample value resolution, noise level, etc.). Such configuration may further, for example, correspond to output power or power utilization characteristics. Such configuration may still further, for example, correspond to processing speed. In general, configuration of an access point may comprise configuring how the access point communicates in a particular communication mode (e.g., in accordance with a particular communication protocol). Accordingly, the scope of various aspects of the present invention should not be limited by characteristics of any particular access point configuration.

The determined communication configuration information may comprise characteristics of any of a variety of types of information that may be utilized to configure an access point. The communication configuration information may, for example, comprise information utilized to configure portions of the access point for effective communication in a particular communication mode (e.g., in accordance with a particular communication protocol).

For example and without limitation, the communication configuration information may comprise settings for various hardware and/or software modules performing physical layer communication. The communication configuration information may, for example, comprise configuration parameters for various tuners, frequency synthesizers or phase lock loops, filters, signal generators, transmitters, coders/decoders, etc.

Also for example, the communication configuration information may comprise settings for various hardware and/or software modules performing MAC layer or other higher layer communications. For example, the communication configuration information may comprise settings for performing secure communications or medium access. Also for example, the communication configuration information may comprise configuration information corresponding to various communication protocols. Further for example, the communication configuration information may comprise configuration information corresponding to beacon signal characteristics and/or signal power levels. Still further for example, the communication configuration information may comprise configuration information corresponding to sleep mode operation.

The communication configuration information may, for example, comprise executable software instructions, which may, for example, be executed during communication in a particular communication mode. As a non-limiting example, such software instructions may comprise a software module that is executed during encoding/decoding, encrypting/decrypting or transmitting/receiving information communicated in the particular communication mode.

The communication configuration information may, for example, comprise information that is customized to the access point. For example, the source of the communication configuration information may be aware of the specific configuration needs of the access point or with a group of access points to which the access point belongs (e.g., access point type, network type, etc.). Alternatively, for example, the communication configuration information may comprise a set of configuration information that is universal for a communication mode (e.g., designed to provide communication configuration information that any access point may utilize). For example, in such an exemplary scenario, the access point may determine which of the universal communication configuration information is applicable to the access point.

In another example, the communication configuration information may comprise a predetermined communication setting profile associated with a particular geographical region. For example, in an exemplary scenario where the access has recently entered service in a nation or region where a particular wireless LAN protocol operates somewhat differently (e.g., frequency range, power levels, coding/decoding, encryption/decryption, etc.), the communication configuration information may comprise a profile of configuration settings designed to enable the access point to communicate using the particular wireless LAN protocol in the particular nation or region.

The communication configuration information may also comprise characteristics of communication configuration information for communication devices or systems other than the access point. For example and without limitation, the communication configuration information may comprise communication configuration information for other access points or for wireless mobile communication devices that may communication with the access point.

In general, the communication configuration information may comprise characteristics of any of a variety of types of information that may be utilized to configure an access point. Accordingly, the scope of various aspects of the present invention should not be limited by characteristics of any particular type of such information.

Step 110 may comprise determining the desired communication configuration information in any of a variety of manners, non-limiting examples of which will be provided below. For example and without limitation, step 110 may comprise determining communication configuration information desired for the access point based, at least in part, on a communication received at the access point.

Step 110 may, for example, comprise receiving such a communication through a user interface of the access point or from a communication device that is communicatively coupled to the access point. For example, an operator may operate a user interface of the access point to indicate to the access point that a particular set of communication configuration information is necessary.

Also for example, a communication device (e.g., a downstream wireless or mobile wireless communication device or an upstream network node or central controller) communicating with the access point may communicate to the access point that a particular set of communication configuration information is necessary. For example, the access point may receive the communication utilizing a first communication protocol, where the communication configuration information concerns a second communication protocol (e.g., completely independent from the first communication protocol or corresponding to an updated version of the first communication protocol).

The received communication may, for example, comprise information indicating the communication configuration information that is desired. As a non-limiting example, the received communication may comprise information indicating to the access point that the access point needs configuration information corresponding to the latest version of a particular communication protocol. The received communication may also, for example, comprise information indicating where the access point may acquire the desired communication configuration information. As a non-limiting example, the received communication may indicate to the access point that the desired communication configuration information is available from a server at a particular address (e.g., a URL address or other communication network address). The server of such communication configuration information may, for example, be associated with a standards organization (e.g., IEEE, ISO, etc.) or with a manufacturer (e.g., of the access point or of a chipset or other component of the access point).

Step 110 may also, for example, comprise determining the desired communication configuration information by communicating with a provider of such information. For example, step 110 may comprise communicating with a server of communication configuration information to determine whether the access point has desired communication configuration information. As mentioned previously, such a server of communication configuration information may be associated with a central network controller, a standards organization, an equipment or chipset manufacturer, etc.

Step 110 may further, for example, comprise determining the desired communication configuration information by occasionally communicating with a provider of such information. For example, step 110 may comprise periodically communicating with a provider of communication configuration information. Also for example, step 110 may comprise communicating with a provider of communication configuration information in accordance with a predefined time schedule. Still further for example, step 110 may comprise communicating with a provider of communication configuration information in response to a real-time operating condition.

Step 110 may still further, for example, comprise determining the desired communication configuration information through negotiations with a communication device attempting to establish communication with the access point. In a non-limiting exemplary scenario, a mobile wireless communication device may establish communication with the access point utilizing a first communication protocol and then query the access point to determine whether the access point is capable of communicating in accordance with a second communication protocol (e.g., a preferred communication protocol). In response to such a query, the access point may determine that communication configuration information corresponding to the second communication protocol is desirable.

Step 110 may yet further, for example, comprise determining the desired communication configuration information based on the arrival of such information at the access point. As a non-limiting example, a central network controller, manufacturer, standards organization or governmental regulating body may push communication configuration information to the access point. The arrival of such pushed information at the access point may indicate to the access point (e.g., by itself or in combination with other factors) that the access point desires the arrived communication configuration information.

In general, step 110 may comprise determining communication configuration information desired for the access point. Accordingly, the scope of various aspects of the present invention should not be limited by characteristics of any particular manner of making such determination.

The exemplary method 100 may, at step 120, comprise acquiring the determined communication configuration information. Step 120 may comprise acquiring the determined communication configuration information in any of a variety of manners. For example and without limitation, step 120 may comprise acquiring the determined communication configuration information from local storage (e.g., a memory device geographically collocated with the access point).

Also for example, step 120 may comprise acquiring the communication configuration information from a device that is communicatively coupled to the access point. As mentioned previously, such a device may comprise a server of communication configuration information that is communicatively coupled to the access point. Such a server may, for example, comprise a server for the communication network to which the access point is providing access. Such a central server may, for example, provide communication configuration information to access points of the communication network. Such a server may also, for example, be associated with a standards organization (e.g., IEEE, ISO, etc.) or an equipment or electronic component manufacturer that manufactured the access point or a portion thereof.

Step 120 may, for example, comprise acquiring the determined communication configuration information in a solicited manner. For example, step 120 may comprise soliciting the determined communication configuration information from a source of such information. In such an exemplary scenario, step 120 may also comprise determining a source of the desired communication configuration information. Such a source may be known or may be communicated to the access point. Also, step 120 may comprise initiating a search for a source having the desired communication configuration information.

Step 120 may, for example, comprise acquiring the desired communication configuration information in an unsolicited manner. In a non-limiting exemplary scenario, step 120 may comprise receiving communication configuration information that is pushed to the access point (e.g., by a network controller, user, network terminal, equipment or component manufacturer, standards organization, etc.). In such an exemplary scenario, step 110 may comprise determining the desired communication configuration information based on the arrival of unsolicited communication configuration information at the access point.

Step 120 may comprise acquiring the desired communication configuration information through any of a variety of communication media. For example, step 120 may comprise acquiring the desired communication configuration information utilizing a communication medium generally associated with the communication network to which the access point is providing access. Alternatively, step 120 may comprise acquiring the desired communication configuration information utilizing a communication medium different from that generally associated with the communication network.

Step 120 may also comprise acquiring the desired communication configuration information utilizing any of a variety of communication protocols. For example, step 120 may comprise acquiring the desired communication configuration information utilizing a first communication protocol, where the desired communication configuration information corresponds to a second communication protocol (e.g., different from the first communication protocol). In various non-limiting exemplary scenarios, the communication configuration information may be communicated or formatted in accordance with a known (e.g., standard or universal) protocol. For example, various portions of the communication configuration information may be received in a predefined format, flagged with predefined identification markers, received in a particular order, etc.

Also for example, step 120 may comprise acquiring the communication configuration information through any of a variety of communication networks (e.g., telecommunication networks, television networks, computer networks, terrestrial and satellite communication networks, etc.). For example, step 120 may comprise acquiring the communication configuration information through a general-purpose communication network or a communication network that is substantially dedicated to the communication of communication configuration information.

Also for example, step 120 may comprise acquiring communication configuration information through a first communication port of the access point, where the communication configuration information corresponds to configuring a second communication port. Further for example, step 120 may comprise acquiring communication configuration information through a first physical layer, where the communication configuration information corresponds to configuring a second physical layer. Still further for example, step 120 may comprise acquiring communication configuration information through a first MAC layer, where the communication configuration information corresponds to configuring a second MAC layer.

Figure 2:
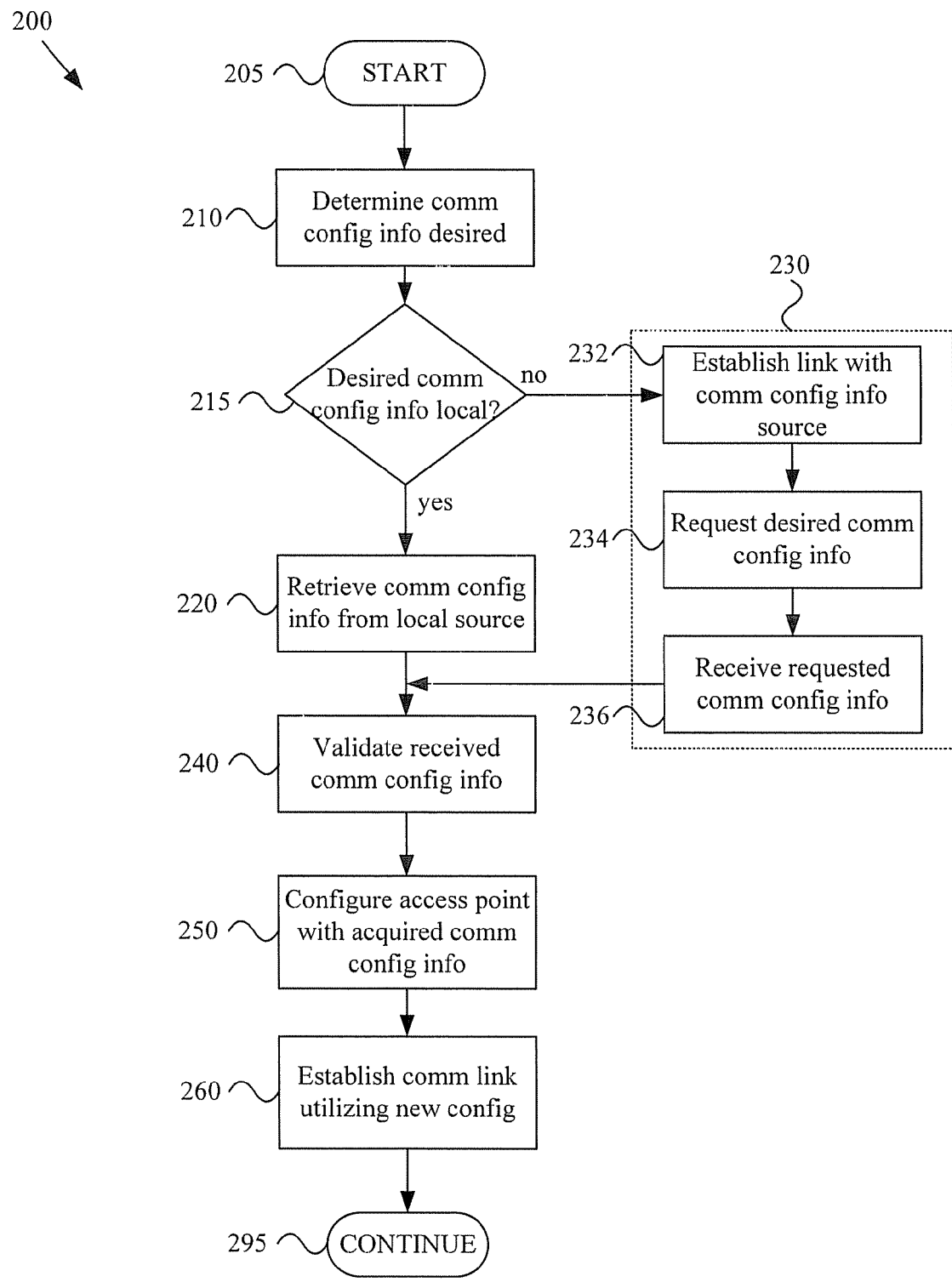
FIG. 2 is a diagram illustrating a method, in a wireless communication network access point, for configuring operation of the access point, in accordance with various aspects of the present invention.

As will be illustrated in FIG. 2, step 120 may, in various scenarios, comprise determining whether desired communication configuration information is stored locally. If the desired communication configuration information is stored locally, then step 120 may comprise acquiring the desired communication configuration information from local storage, as discussed previously. If, however, the desired communication configuration is not stored locally, then step 120 may comprise acquiring the desired communication configuration information from a non-local source in any of a variety of manners, some of which were presented previously.

The determination and acquisition of communication configuration information may, for example, comprise performing various security functions. For example and without limitation, the determination and acquisition of communication configuration information might comprise limiting communication to only trusted sources. For example, steps 110 and 120 might comprise performing various authentication and secure communication functions. Such functions may, for example, be desirable to ensure that the integrity of the access point, and the communication network as a whole, are not compromised.

In general, step 120 may comprise acquiring the determined communication configuration information desired for the access point (e.g., as determined at step 110). Accordingly, the scope of various aspects of the present invention should not be limited by characteristics of any particular manner of acquiring communication configuration information.

The exemplary method 100 may, at step 130, comprise configuring (e.g., programming) the access point with the acquired communication configuration information (e.g., as acquired at step 120). Step 130 may comprise configuring the access point with the acquired communication configuration information in any of a variety of manners.

For example and without limitation, step 130 may comprise storing the communication configuration information in a memory space allocated to storing communication configuration information. For example, step 130 may comprise storing acquired communication configuration information in a predefined data structure corresponding to communication configuration information for a particular communication mode or set of communication modes.

In a non-limiting exemplary scenario, the access point may comprise various memory spaces allocated to static default configuration settings and various other memory spaces allocated to dynamic or configurable settings. In such an exemplary scenario, step 130 may comprise storing the acquired communication configuration information in memory space allocated to dynamic communication configuration settings.

Also for example, step 130 may comprise storing the communication configuration information (or at least a portion thereof) in hardware registers dedicated to storing communication configuration information (e.g., frequency settings, power settings, filter tap parameters, codec settings, tuner settings, etc.). In a non-limiting exemplary scenario, a filter may be communicatively coupled to a plurality of control registers through a switch, where the switch is controlled as a function of communication mode. For example, operating in a next communication mode may cause the switch from present communication configuration information to next communication configuration information for various devices supporting the next communication mode.

In general, step 130 may comprise configuring (e.g., programming) the access point with the acquired communication configuration information (e.g., as acquired at step 120). Accordingly, the scope of various aspects of the present invention should not be limited by characteristics of any particular manner of configuring an access point with acquired communication configuration information.

The exemplary method 100 may, at step 195, comprise performing continued processing. Step 195 may comprise characteristics of any of a large variety of continued processing. For example and without limitation, step 195 may comprise establishing a communication link with a new access point configuration (e.g., as configured at step 130).

Step 195 may also, for example, comprise directing execution flow of the exemplary method 100 to step 110 for continued configuration information determination and acquisition. For example, step 195 may comprise interfacing with a user and/or other system to determine whether additional communication configuration information is desired. Further for example, step 195 may comprise determining geographical location and/or capabilities of the access point to determine whether to seek additional communication configuration information.

In general, step 195 may comprise performing any of a large variety of types of continued processing. Accordingly, the scope of various aspects of the present invention should not be limited by characteristics of any particular type of continued processing.

The exemplary method 100 was presented to provide specific non-limiting illustrations of various generally broader aspects of the present invention. Accordingly, the scope of various aspects of the present invention should not be limited by specific characteristics of the exemplary method 100.

FIG. 2 is a diagram illustrating a method 200, in a wireless communication network access point, for configuring operation of the access point, in accordance with various aspects of the present invention. The exemplary method 200 may, for example and without limitation, share any or all characteristics with the exemplary method 100 illustrated in FIG. 1 and discussed previously.

The exemplary method 200 may, at step 210, comprise determining communication configuration information desired for the access point. Step 210 may, for example and without limitation, share any or all characteristics with step 110 of the exemplary method 100 illustrated in FIG. 1 and discussed previously.

The exemplary method 200 may, at step 215, comprise determining whether the communication configuration information determined at step 210 is stored locally. Step 215 may then, for example, comprise directing execution flow of the method 200 based on such determination.

For example, if the communication configuration information determined at step 210 is stored locally, then step 215 may comprise directing execution flow of the exemplary method 200 to step 220 for retrieval of the determined communication configuration information from the local source. If, however, the communication configuration information determined at step 210 is not stored locally, then step 215 may comprise directing execution flow of the exemplary method 200 to step 230 for acquiring the determined communication configuration information from a non-local source.

The exemplary method 200 may, at step 220, comprise acquiring (e.g., retrieving) the determined communication configuration information (e.g., as determined at step 210) from a local source. Such a local source may, for example, comprise characteristics of a memory device geographically collocated with the access point. Such a memory device may, for example, comprise characteristics of any of a variety of memory types (e.g., a computer hard drive, CD drive, DVD drive, solid-state memory device, etc.) that may be a part of, or geographically collated, with an access point.

The exemplary method 200 may, at step 230, comprise acquiring the determined communication configuration information (e.g., as determined at step 210) from a non-local source. Step 230 may, for example, comprise acquiring the determined communication configuration information in any of a variety of manners. Various non-limiting examples of such acquisition were presented previously with regard to FIG. 1. The non-limiting exemplary scenario illustrated in FIG. 2 comprises soliciting and receiving the desired communication configuration information from a non-local source at steps 232-236.

The exemplary method 200 may, at step 232, comprise establishing a communication link with a communication configuration information source over which the desired communication configuration information may be obtained. As discussed previously, a source of communication configuration information may comprise any of a variety of characteristics. Such a source may, for example, comprise characteristics of a central or distributed server. Such a source may, for example, be associated with a standards organization, manufacturer, communication provider, etc.

Step 232 may comprise establishing the communication link in any of a variety of manners (e.g., depending on the communication configuration information source). For example and without limitation, step 232 may comprise determining a source of the desired communication configuration information and/or an associated communication network address associated with the source, and then establishing a communication link with such source(s). Also for example, step 232 may comprise communicating an inquiry regarding the desired communication configuration information to a plurality of potential sources of such information. Further for example, step 232 may comprise establishing a communication link with a predetermined source of communication configuration information.

Step 232 may, for example, generally comprise establishing a communication link in a manner commensurate with a communication protocol (e.g., standard or proprietary) associated with the communication link. As discussed previously, such a communication link may comprise security mechanisms to ensure the communication of communication configuration information is secure.

The exemplary method 200 may, at step 234, comprise requesting (e.g., over the communication link established at step 232) the desired communication configuration information from the information source. For example and without limitation, step 234 may comprise communicating a dedicated request over the communication link to request that the information source communicate the communication configuration information (e.g., as identified at step 210) to the access point. Also for example, step 234 may comprise sending one or more requests to a plurality of potential information sources.

A request may comprise any of a variety of information request characteristics. For example and without limitation, a request may comprise information identifying the access point (e.g., serial number, PIN, architecture, manufacturer, model number, operational features, etc.). A request may also, for example, comprise security information. A request may further, for example, comprise information identifying a particular desired set of communication configuration information. A request may additionally, for example, comprise a blanket request for all current communication configuration information. Also for example, a request may comprise information identifying current communication configuration information of the access point and a request to receive updated communication configuration information if available.

The exemplary method 200 may, at step 236, comprise receiving the requested communication configuration information from the information source (e.g., over the communication link established at step 232). Receiving the requested communication configuration information may comprise receiving the requested communication configuration information in any of a variety of manners. For example, step 236 may comprise receiving the requested communication configuration information in a point-to-point, point-to-multipoint or broadcast communication. Step 236 may generally, for example, comprise receiving the requested communication configuration information in accordance with a protocol associated with the communication link established at step 232.

The exemplary method 200 may, at step 240, comprise validating the acquired communication configuration information (e.g., acquired from a local or non-local source). Such validation may, for example and without limitation, comprise determining whether the source of the communication configuration information is approved and/or whether the integrity of a communication link utilized for retrieving the communication configuration information was secure. Such validation may, for example, comprise verifying that acquired communication configuration information is appropriate for the access point (e.g., compatible with the architecture or capabilities of the access point).

The exemplary method 200 may, at step 250, comprise configuring the access point in accordance with the acquired communication configuration information. Step 250 may, for example and without limitation, share any or all characteristics with step 130 of the exemplary method 100 illustrated in FIG. 1 and discussed previously.

The exemplary method 200 may, at step 260, comprise establishing a communication link utilizing the access point configuration established at step 250. Such a communication link may, for example, communicatively link the access point to a communication terminal (e.g., a mobile wireless communication device). Also for example, such a communication link may communicatively couple the access point to another access point, central controller or other node in a communication network.

The exemplary method 200 may, at step 295, comprise performing continued processing. Step 295 may comprise characteristics of any of a large variety of continued processing. For example, step 295 may comprise directing execution flow of the exemplary method 200 to step 210 for continued configuration information determination, acquisition and utilization. For example, step 295 may comprise interfacing with a user and/or other system to determine whether additional communication configuration information is desired. Further for example, step 295 may comprise determining geographical location and/or capabilities of the access point to determine whether to seek additional communication configuration information. In general, step 295 may comprise performing any of a large variety of types of continued processing. Accordingly, the scope of various aspects of the present invention should not be limited by characteristics of any particular type of continued processing.

The exemplary method 200 was presented to provide specific non-limiting illustrations of various generally broader aspects of the present invention. Accordingly, the scope of various aspects of the present invention should not be limited by specific characteristics of the exemplary method 200.

Note that any or all steps of the exemplary methods 100, 200 illustrated in FIGS. 1-2 may be performed automatically by the access point (i.e., without human interaction during the performance of such steps). For example and without limitation, an access point may determine and/or acquire communication configuration information and/or configure the access point in accordance with acquired communication configuration without human interaction during the determining, acquiring or configuring process.

Figure 3:
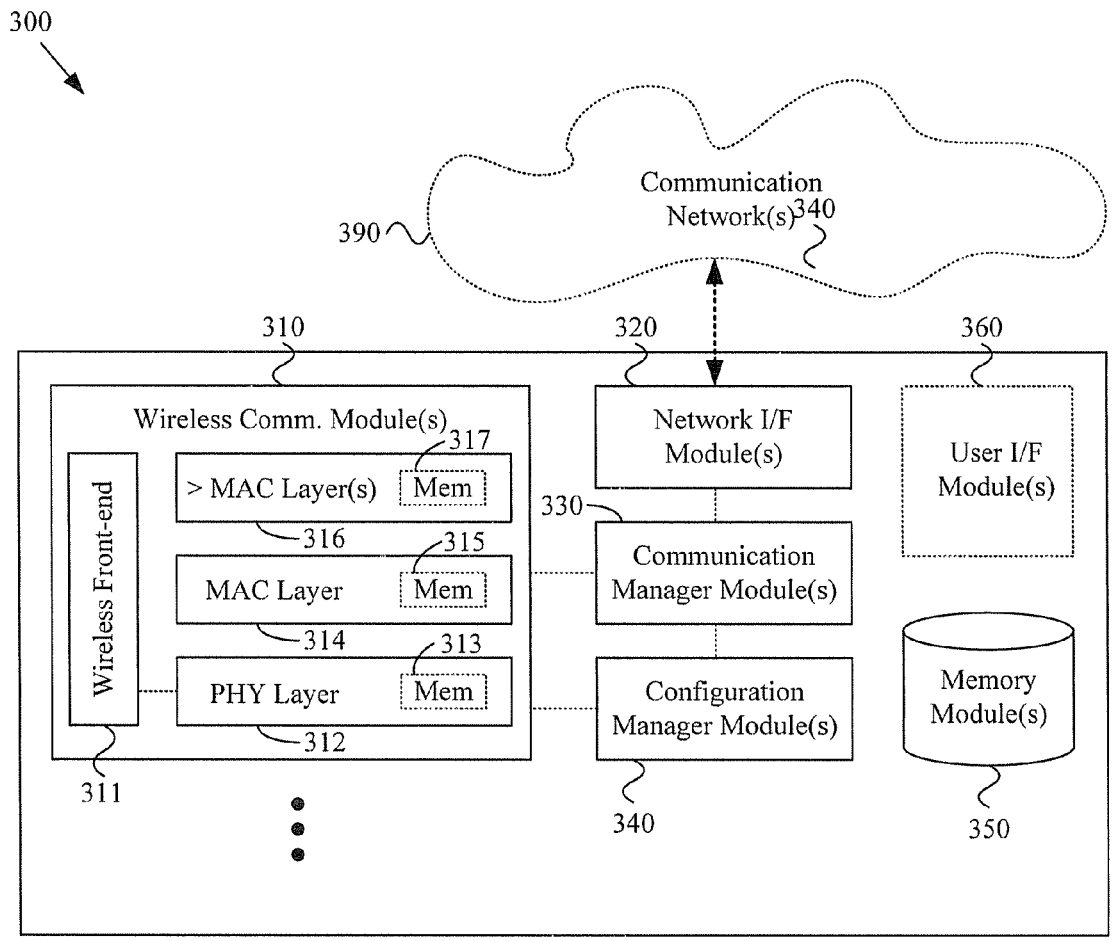
FIG. 3 is a block diagram illustrating a system in a wireless communication network access point that configures operation of the access point, in accordance with various aspects of the present invention.

FIG. 3 is a block diagram illustrating a system 300 in a wireless communication network access point that configures operation of the access point, in accordance with various aspects of the present invention. The exemplary system 300 may, for example and without limitation, share any or all functional characteristics with the exemplary methods 100, 200 illustrated in FIGS. 1-2 and discussed previously.

The access point may comprise characteristics of an access point associated with any of a variety of types of wireless communication networks. For example and without limitation, the access point may comprise characteristics of an access point associated with a wireless computer network (e.g., WLAN, WPAN, WWAN, WMAN, Bluetooth, IEEE 802.11, UWB, IEEE 802.15, IEEE 802.16, etc.), cellular telecommunication network (e.g., GEM/GPRS/EDGE, CDMA/WCDMA/UMTS, TDMA/PDC, etc.), paging network, portable email device network, television network, satellite communication network, etc. Accordingly, the scope of various aspects of the present invention should not be limited by characteristics of any particular type of wireless communication network access point.

The exemplary system 300 may, for example, comprise one or more wireless communication module(s) 310. The exemplary system 300 may also comprise one or more network interface modules 320. The exemplary system 300 may additionally comprise a communication manager module 330 and a configuration manager module 340. The exemplary system 300 may additionally comprise a memory 350 and one or more user interface modules 360. Any or all of the modules of the wireless communication module 310 may be adaptable (e.g., programmable) to operate in a plurality of communication configurations. Such communication configurations may, for example, correspond to respective communication modes. Such communication configurations may, for example and without limitation, comprise radio configurations and/or other signal or data processing configurations.

The wireless communication module 310 may comprise a wireless front-end module 311. The wireless front-end module 311 may, for example, comprise any of a variety of hardware and/or software modules adapted for communicating over a wireless interface with other wireless communication systems. For example, the wireless front-end module 311 may comprise characteristics of various transceivers utilized to implement various aspects of physical layer communication for an access point.

The wireless communication module 310 may also comprise any of a variety of communication interface hardware and/or software modules. For example, the wireless communication module 310 may comprise a physical layer module 312, MAC layer module 314 and higher layer module(s) 316. Note that the various communication layers are merely illustrative and should not limit the scope of various aspects of the present invention to characteristics of communication modules having or implementing such layers.

The physical layer module 312 may generally provide various physical layer services in support of one or more wireless communication modes. For example and without limitation, the physical layer module 312 may be adapted to sense carrier condition (e.g., whether a channel is busy), transmit or receive information (e.g., via continuous signals, packets or frames, etc.). Also for example, the physical layer module 312 may be adapted to form data units, select frequency, modulate/demodulate, encode/decode, etc.

The physical layer module 312 may, for example, comprise a physical layer memory 313 that stores various physical layer configuration parameters. Though the physical layer memory 313 is illustrated within the physical layer module 312, the physical layer memory 313 could reside in any of a variety of memory types and/or locations. For example, the physical layer memory 313 may correspond to hardware registers of the wireless communication module 310. Also for example, the physical layer memory 313 may correspond to a memory space (e.g., a memory space allocated to the wireless communication module 310) of the memory module 350. The scope of various aspects of the present invention should not be limited by any particular type of memory or any particular memory location.

The physical layer memory 313 may store any of a variety of communication configuration information (e.g., settings and/or parameters). For example and without limitation, the physical layer memory 313 may store information indicative of tuner settings, frequency synthesizer or PLL settings, modulation settings, filter settings, encoder/decoder settings, power settings, data parsing settings, signal detection settings, A/D converter settings, etc. The scope of various aspects of the present invention should not be limited by characteristics of any particular type of physical layer configuration information.

The MAC layer module 314 may generally provide a variety of functions that support the operation of a communication mode. For example, the MAC layer module 314 may be adapted to provide MAC layer services for a first communication mode. For example and without limitation, the MAC layer module 314 may be adapted to coordinate access to a shared radio channel and utilize one or more protocols to enhance communications. The MAC layer module 314 may also, for example, be adapted to perform scanning functions, authentication functions, association functions, encryption/decryption, power save management, packet fragmentation, etc.

The MAC layer module 314 may, for example, comprise a MAC layer memory 315 that stores various MAC layer configuration parameters. Though the MAC layer memory 315 is illustrated within the MAC layer module 314, the MAC layer memory 315 could reside in any of a variety of memory types and/or locations. For example, the MAC layer memory 315 may correspond to hardware registers of the wireless communication module 310. Also for example, the MAC layer memory 315 may correspond to a memory space (e.g., a memory space allocated to the wireless communication module 310) of the memory module 350. The scope of various aspects of the present invention should not be limited by any particular type of memory or any particular memory location.

The MAC layer memory 315 may store any of a variety of communication configuration information (e.g., settings and/or parameters). For example and without limitation, the MAC layer memory 315 may store information indicative of various medium access control characteristics, scanning operation, secure communication, power save operation, fragmentation, etc. The scope of various aspects of the present invention should not be limited by characteristics of any particular type of MAC layer configuration information.

The higher layer module(s) 316 may generally perform various higher-level communication functions relative to the MAC layer module 314 and PHY layer module 312. For example, the higher layer module(s) 316 may be adapted to provide various higher-level communication services associated with a communication mode.

As mentioned previously, the system 300 may comprise a plurality of wireless communication modules. Each of such wireless communication modules may, for example, share any or all characteristics with the wireless communication module 310 discussed above. Such communication interface modules may, for example, be independent or may share various components with the wireless communication module 310 discussed above.

In a non-limiting exemplary scenario, the wireless communication module 310 may correspond to communication in a first communication mode, and a second wireless communication module may correspond to communication in a second communication mode. In another non-limiting exemplary scenario, at least a portion of the wireless communication module 310 may be utilized for communication in a plurality of communication modes. Accordingly, the scope of various aspects of the present invention should not necessarily be limited by characteristics of a one-to-one correspondence between a wireless communication module and a particular communication mode.

The network interface module(s) 320 may be adapted to communicatively couple the system 300 (e.g., the wireless communication module 310) to one or more communication networks 390. Such communication networks may comprise characteristics of any of a variety of communication networks to which the access point may provide access. For example and without limitation, the network interface module(s) 320 may be adapted to communicatively couple the system 300 (e.g., an access point utilizing the system 300) to the Internet, a LAN, WAN, PAN, MAN, telecommunication network, television network, satellite or terrestrial communication network, etc.

The communication manager module 330 may generally manage communication for the system 300. For example and without limitation, the communication manager module 330 may manage general communication operations for an access point utilizing the system 300. The communication manager module 330 may, for example, manage the flow of information to and from the system 300 and one or more other devices communicatively coupled to the system 300. The communication manager module 330 may, for example, manage the flow of information between a wireless communication device (e.g., a mobile wireless communication device) coupled to the system 300 and another device communicatively coupled to the system 300 through the communication network 390.

The memory module 350 may generally be adapted to store information (e.g., communication configuration information, executable software instructions, intermediate processing data, user information, etc.). The memory module 350 may comprise characteristics of any of a variety of memory types. For example, the memory module 350 may comprise characteristics of non-volatile memory. Further for example, the memory module 350 may comprise characteristics of volatile memory. Also for example, the memory module 350 may comprise characteristics of a hard drive, diskette reader/writer, CD/DVD reader/writer, removable memory module, etc. Accordingly, the scope of various aspects of the present invention should not be limited by characteristics of any particular type of memory.

The user interface module(s) 360 may generally be adapted to provide a communication link between the system 300 (e.g., an access point utilizing the system) and a user of the system 300. The user interface module(s) 360 may comprise characteristics of any of a variety of user interface module(s). For example and without limitation, the user interface module(s) 360 may comprise characteristics of a keyboard or mouse user interface, an audio/visual user interface, etc. Accordingly, the scope of various aspects of the present invention should not be limited by characteristics of any particular type of user interface module.

The configuration manager module 340 may generally manage configuration of the system 300 (e.g., an access point utilizing the system 300). For example and without limitation, the configuration manager module 340 may share functional characteristics with any, any combination of, or all of the steps of the exemplary methods 100, 200 illustrated in FIGS. 1-2 and discussed previously.

For example, the configuration manager module 340 may be adapted to determine communication configuration information desired for the system 300. Communication configuration information was generally discussed previously with regard to FIG. 1.

The system 300 (e.g., a wireless communication network access point utilizing the system 300) may be adapted to communicate with wireless terminals (e.g., wireless mobile communication devices), and/or a communication network to which the system 300 is providing access, in one or more communication modes, many examples of which were discussed previously (e.g., a telecommunication mode, computer network communication mode, television network communication mode, terrestrial or satellite communication mode, etc.). The scope of various aspects of the present invention should not be limited by characteristics of one or more particular communication modes in which an access point is capable of communicating.

As mentioned previously, the system 300 may be configurable (e.g., programmable) for operation in one or more communication modes. Such configuration may, for example, be characterized by a selected set of communication radio or signal processing modules, sub-modules or components to utilize to process a communication signal. Such configuration may also, for example, be characterized by the manner in which a module (e.g., hardware and/or software module) of the system 300 operates. Such configuration may further, for example, be characterized by particular software code that is executed (e.g., in a PHY layer, MAC layer, transport layer, network layer, application layer, etc.) to process a communication signal.

Various exemplary aspects of communication configuration information were discussed previously. For example and without limitation, the communication configuration information may comprise settings for various hardware and/or software modules performing physical layer communication (e.g., in the PHY layer module 312 and/or wireless front-end 311). Also for example, the communication configuration information may comprise settings for various hardware and/or software modules performing MAC layer or other higher layer communications (e.g., in the MAC layer module 314 and/or higher layer modules 316).

In general, the communication configuration information may comprise characteristics of any of a variety of types of information that may be utilized to configure the system 300 or an access point utilizing the system 300. Accordingly, the scope of various aspects of the present invention should not be limited by characteristics of any particular type of such information.

The configuration manager module 340 may be adapted to determine the desired communication configuration information in any of a variety of manners, non-limiting examples of which were discussed previously with regard to step 110 of the exemplary method 100 illustrated in FIG. 1. For example and without limitation, the configuration manager module 340 may be adapted to determine communication configuration information desired for the system 300 based, at least in part, on a communication received at the system 300 (e.g., received through the user interface 360 of the system 300 or received from another communication system through the network interface module 320 or wireless communication module 310). The received communication may, for example, comprise information identifying the communication configuration information that is desired or indicating where the system 300 may acquire the desired communication configuration information.

The configuration manager module 340 may also, for example, be adapted to determine the desired communication configuration information by communicating with a provider of such information (e.g., utilizing the network interface module 320 or the wireless communication module 310). Such communication may, for example, be in accordance with a predefined schedule or in response to a detected operating condition. The configuration manager module 340 may additionally, for example, be adapted to determine the desired communication configuration information through negotiations with a communication device (e.g., a wireless mobile communication device) attempting to establish communication with an access point utilizing the system 300. The configuration manager module 340 may further, for example, be adapted to determine the desired communication configuration information based on the arrival of such information (e.g., in an unsolicited manner) at an access point utilizing the system 300.

In general, the configuration manager module 340 may be adapted to determine communication configuration information desired for the access point in any of a variety of manners. Accordingly, the scope of various aspects of the present invention should not be limited by characteristics of any particular manner of, or mechanism for, making such determination.

The configuration manager module 340 may also be adapted to acquire the determined communication configuration information. The configuration manager module 340 may, for example and without limitation, share any or all functional characteristics with step 120 and steps 215-236 of the exemplary methods 100, 200 illustrated in FIGS. 1-2 and discussed previously. The configuration manager module 340 may be adapted to acquire the determined communication configuration information in any of a variety of manners.

For example and without limitation, the configuration manager module 340 may be adapted to acquire the determined communication configuration information from local storage (e.g., memory module 350 or other memory device geographically collocated with the system 300).

Also for example, the configuration manager module 340 may be adapted to acquire the communication configuration information from a device that is communicatively coupled to the system 300 (e.g., through the network interface module 320 and/or the wireless communication module 310). As mentioned previously, such a device may comprise a server of communication configuration information that is communicatively coupled to the system 300.

The configuration manager module 340 may, for example, be adapted to acquire the determined communication configuration information in a solicited manner. For example, the configuration manager module 340 may be adapted to solicit the determined communication configuration information from a source of such information (e.g., utilizing the network interface module 320 and/or wireless communication module 310). In such an exemplary scenario, the configuration manager module 340 may also be adapted to determine a source of the desired communication configuration information.

The configuration manager module 340 may also, for example, be adapted to acquire the desired communication configuration information in an unsolicited manner. In a non-limiting exemplary scenario, the configuration manager module 340 may be adapted to receive communication configuration information that is pushed to the system 300 (e.g., by a network controller, user, network terminal, equipment or component manufacturer, standards organization, etc.). In such an exemplary scenario, the configuration manager module 340 may be adapted to determine and acquire the desired communication configuration information based on the arrival of unsolicited communication configuration information at the system 300 (e.g., received by the network interface module 320 or wireless communication module 310).

In determining and/or acquiring communication configuration information, the configuration manager module 340 may be adapted to perform various security functions. For example and without limitation, during such operations, the configuration manager module 340 may be adapted to communicate with only trusted sources. The configuration manager module 340 may also, for example, be adapted to perform various authentication and secure communication functions. Such functions may, for example, be desirable to ensure that the integrity of the system 300 (and/or the access point utilizing the system 300) and the communication network 390 as a whole are not compromised.

In general, the configuration manager module 340 may be adapted to acquire the determined communication configuration information desired for the system 300. Accordingly, the scope of various aspects of the present invention should not be limited by characteristics of any particular manner of, or mechanism for, acquiring communication configuration information.

The configuration manager module 340 may further be adapted to configure (e.g., program) the system 300 (or access point utilizing the system 300) with acquired communication configuration information. The configuration manager module 340 may, for example and without limitation, be adapted to share any or all functional characteristics with steps 130 and 250 of the exemplary methods 100, 200 illustrated in FIGS. 1-2 and discussed previously. The configuration manager module 340 may be adapted to configure the system 300 with the acquired communication configuration information in any of a variety of manners.

For example and without limitation, the configuration manager module 340 may be adapted to store the acquired communication configuration information in any of a variety of memory spaces (e.g., the memory module 350, PHY layer memory 313, MAC layer memory 315, higher layer memory 317, etc.). For example, the configuration manager module 340 may be adapted to store the acquired communication configuration information in a memory space allocated to storing communication configuration information. Also for example, the configuration manager module 340 may be adapted to store acquired communication configuration information in a predefined data structure corresponding to configuration information for a particular communication mode.

In a non-limiting exemplary scenario, the system 300 may (e.g., in the memory module 350, PHY layer memory 313, MAC layer memory 315, or higher layer memory 317) comprise various memory spaces allocated to static default settings or parameters and various other memory spaces allocated to dynamic or configurable settings or parameters. In such an exemplary scenario, the configuration manager module 340 may be adapted to store the acquired communication configuration information in memory space allocated to dynamic communication configuration settings.

Also for example, the configuration manager module 340 may be adapted to store the communication configuration information (or at least a portion thereof) in hardware registers dedicated to storing communication configuration information (e.g., frequency settings, power settings, filter tap parameters, codec settings, tuner settings, A/D converter settings, etc.). In a non-limiting exemplary scenario, a filter may be communicatively coupled to a plurality of control registers through a switch, where the switch is controlled as a function of communication mode. For example, operating in a next communication mode may cause the switch from present communication configuration information to next communication configuration information for various devices supporting the next communication mode.

In general, the configuration manager module 340 may be adapted to configure (e.g., program) the system 300 with acquired communication configuration information. Accordingly, the scope of various aspects of the present invention should not be limited by characteristics of any particular manner of, or mechanism for, configuring a system (e.g., an access point) with acquired communication configuration information.

The configuration manager module 340 may be further adapted to perform any of a variety of functions. For example and without limitation, the configuration manager module 340 may share any or all functional characteristics discussed previously with regard to steps 195 and 240-295 of the exemplary methods 100, 200 illustrated in FIGS. 1-2 and discussed previously. For example, the configuration manager module 340 may be adapted to validate acquired communication configuration information and/or the source of such information. Also for example, the configuration manager module 340 may be adapted to establish a communication link, for example, utilizing the wireless communication module 310 configured in accordance with acquired communication configuration information. Further for example, the configuration manager module 340 may be adapted to determine and acquire additional communication configuration information and configure the system 300 accordingly.

The exemplary system 300 was presented to provide specific non-limiting illustrations of various generally broader aspects of the present invention. Accordingly, the scope of various aspects of the present invention should not be limited by specific characteristics of the exemplary system 300.

Figure 4:
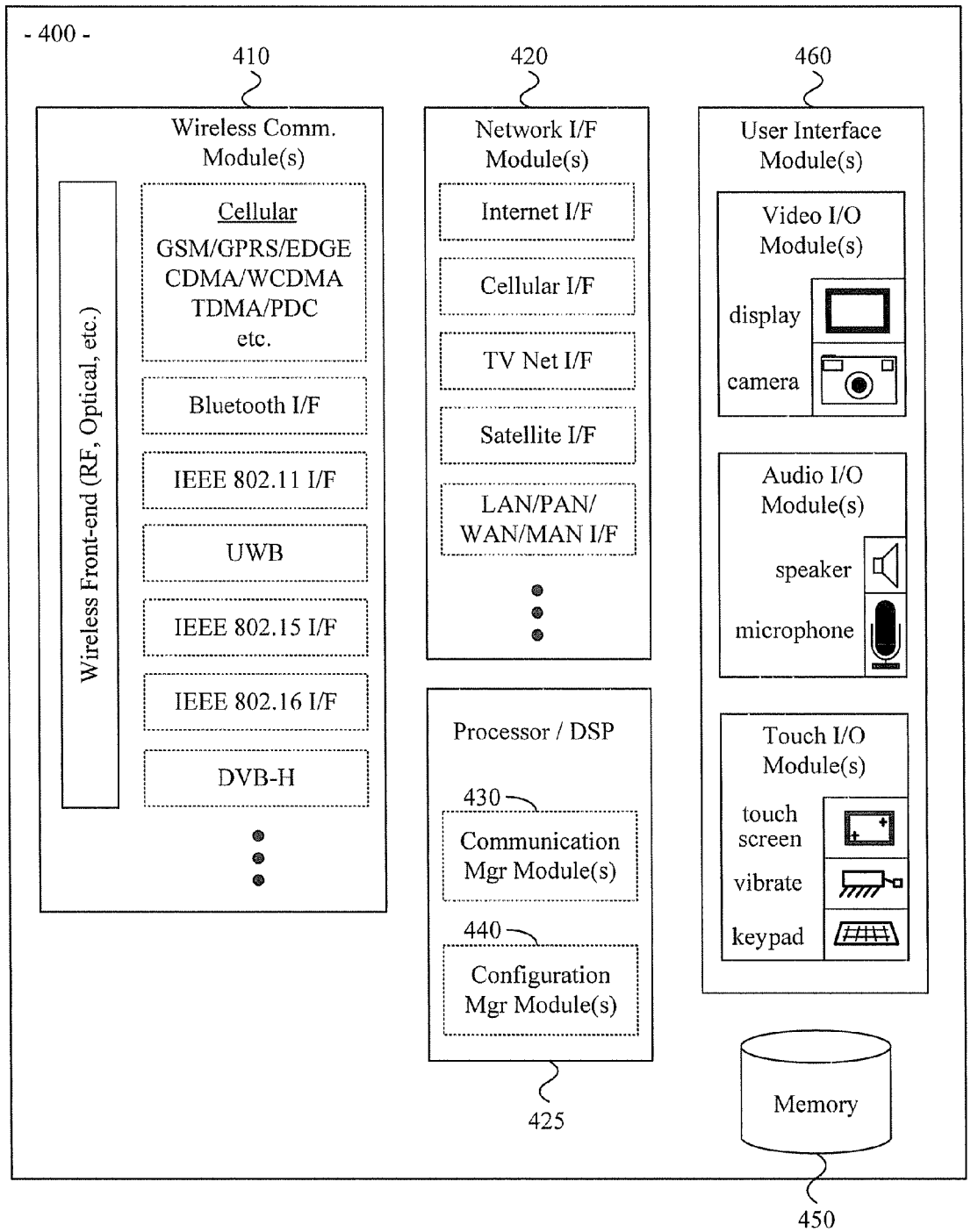
FIG. 4 is a block diagram illustrating a system in a wireless communication network access point that configures operation of the access point, in accordance with various aspects of the present invention.

FIG. 4 is a block diagram illustrating a system 400 in a wireless communication network access point that configures operation of the access point, in accordance with various aspects of the present invention. The exemplary system 400 may, for example and without limitation, share any or all characteristics with the exemplary system 300 illustrated in FIG. 3 and discussed previously. Also for example, the exemplary system 400 may share any or all functional characteristics with the exemplary methods 100, 200 illustrated in FIGS. 1-2 and discussed previously.

The exemplary system 400 may comprise one or more wireless communication modules 410. The wireless communication module(s) 410 may, for example and without limitation, share any or all characteristics with the wireless communication module(s) 310 of the exemplary system 300 illustrated in FIG. 3. For example, the wireless communication module(s) 410 may comprise a wireless front-end. Also for example, the wireless communication module(s) 410 may comprise one or more cellular communication interface modules adapted to communicate in a cellular communication mode (e.g., in accordance with any of, any set of, or all of GSM/GPRS/EDGE, CDMA/WCDMA/UMTS, TDMA/PDC, etc.). Further for example, the wireless communication module(s) 410 may comprise an IEEE 802.11 communication interface module adapted to communicate in an 802.11 wireless LAN communication mode. Also for example, the wireless communication module(s) 410 may comprise an IEEE 802.15 comm I/F module adapted to communicate in an 802.15 wireless PAN communication mode. Additionally for example, the wireless communication module(s) 410 may comprise an IEEE 802.16 comm. I/F module adapted to communicate in an 802.16 communication mode. Similarly, the communication interface modules 410 may comprise a Bluetooth comm. I/F module, UltraWideBand comm. I/F module and/or DVB-H comm. I/F module. The scope of various aspects of the present invention should not be limited by characteristics of any particular communication interface module or any particular corresponding communication mode.

The exemplary system 400 may comprise one or more various network interface modules 420. The network interface module(s) 420 may, for example and without limitation, share any or all characteristics with the network interface module(s) 320 of the exemplary system 300 illustrated in FIG. 3 and discussed previously. For example, the network interface module(s) 420 may comprise any or all of: an Internet interface module, a cellular interface module, a television interface module, a satellite interface module, a LAN interface module, a PAN interface module, a WAN interface module, a MAN interface module, etc.

The exemplary system 400 may, for example, comprise a processor module 425. Such a processor module 425 may, for example, be adapted to execute instructions to perform any of a large variety of functions. For example and without limitation, the processor module 425 may share any or all characteristics with the communication manager module(s) 330 and/or the configuration manager module 340 of the exemplary system 300 illustrated in FIG. 3. Such a processor module 425 may comprise characteristics of any of a variety of processor types. For example, the processor module 425 may comprise characteristics of a microprocessor, microcontroller, digital signal processor, etc.

The exemplary system 400 may comprise a memory module 450. Such a memory module 450 may, for example and without limitation, share any or all characteristics with the memory module 350 of the exemplary system 300 illustrated in FIG. 3 and discussed previously.

The exemplary system 400 may also comprise one or more user interface modules 460. Such user interface module(s) 460 may, for example and without limitation, share any or all characteristics with the user interface module(s) 360 of the exemplary system 300 illustrated in FIG. 3 and discussed previously. For example, the user interface module(s) 460 may comprise one or more video I/O modules (e.g., corresponding to a display interface, camera interface, video input or output communication lines, etc.). Also for example, the user interface module(s) 460 may comprise one or more audio I/O modules (e.g., corresponding to a speaker, microphone, audio input lines, audio output lines, etc.). Additionally for example, the user interface module(s) 460 may comprise tactile I/O modules (e.g., touch screen, vibration output, keypad, keyboard, mouse, etc.).

For illustrative clarity, the exemplary systems 300 and 400 were presented in terms of various functional modules. Various modules may, for example, be implemented in hardware, software or a combination thereof. Also, various modules may share various sub-modules and/or subcomponents. For example and without limitation, various hardware modules may share various electrical components, and various software modules may share various software subroutines. Also for example, various hardware and/or software modules may be implemented in various degrees of integration. For example, any or all of the illustrated modules may be implemented in a single integrated circuit or integrated circuit chipset. Accordingly, the scope of various aspects of the present invention should not be limited by characteristics of any particular hardware and/or software implementation, by any arbitrary boundaries between various functional modules or by any particular degree of circuit integration.

In summary, various aspects of the present invention provide a system and method in a wireless communication network access point for configuring operation the access point. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a wireless communication network access point, a method for configuring the access point, the method comprising:
   determining communication configuration information desired for the access point;
   acquiring the determined communication configuration information; and
   configuring the access point in accordance with the acquired communication configuration information,
   wherein acquiring the determined communication configuration information comprises:
     determining whether the desired communication configuration information is stored locally; and if the desired communication configuration information is not stored locally, then acquiring the desired communication configuration information from a non-local source, and wherein acquiring the desired communication configuration information from a non-local source comprises:
establishing a communication link between the access point and the non-local source; and
communicating a request for the desired communication configuration information to the non-local source.

2. The method of claim 1, wherein the communication configuration information corresponds to a communication protocol that the access point is not presently configured to communicate in accordance with.

3. The method of claim 1, wherein the communication configuration information corresponds to a communication protocol that the access point is not presently capable of communicating in accordance with.

4. The method of claim 1, wherein the communication configuration information comprises information identifying at least one module of the access point that the access point is to utilize for communicating.

5. The method of claim 1, wherein the communication configuration information comprises information indicating how at least one module of the access point is to process a communication signal.

6. The method of claim 1, wherein the communication configuration information comprises information indicating how the access point is to perform communication at the PHY layer.

7. The method of claim 1, wherein the communication configuration information comprises information indicating how the access point is to perform communication at the MAC layer.

8. The method of claim 1, wherein the communication configuration information comprises executable code to be executed by a processor of the access point.

9. The method of claim 1, wherein determining communication configuration information desired for the access point comprises determining the desired communication configuration information based, at least in part, on a communication received at the access point.

10. The method of claim 9, wherein:
the communication is received utilizing a first communication protocol; and
the desired communication configuration information corresponds to a second communication protocol different from the first communication protocol.

11. The method of claim 10, wherein the second communication protocol is independent of the first communication protocol.

12. The method of claim 10, wherein the second communication protocol is an updated version of the first communication protocol.

13. The method of claim 1, wherein determining communication configuration information desired for the access point comprises determining desired communication configuration information based, at least in part, on user input to the access point.

14. The method of claim 1, wherein determining communication configuration information desired for the access point comprises determining desired communication configuration information based, at least in part, on communication with a mobile wireless communication device communicatively coupled to the access point.

15. The method of claim 1, wherein determining communication configuration information desired for the access point comprises determining desired communication configuration information based, at least in part, on communication with a communication configuration information server.

16. The method of claim 1, wherein acquiring the communication configuration information comprises receiving unsolicited communication configuration information from a device communicatively coupled to the access point.

17. The method of claim 1, wherein the communicated request comprises security information.

18. The method of claim 1, comprising communicating a request for the desired communication configuration information to a plurality of potential information sources.

19. The method of claim 1, wherein the communication configuration information comprises hardware setting information for the access point.

20. In a wireless communication network access point, a method for configuring the access point to communicate in accordance with a communication protocol, the method comprising:
determining communication configuration information desired for the access point, where the desired communication configuration information corresponds to a first communication protocol that the access point is not presently configured to communicate in accordance with, and wherein said determining comprises communicating with a mobile wireless communication device utilizing a second communication protocol that is different from the first communication protocol;
establishing a communication link over which the desired communication configuration information may be obtained;
requesting, over the communication link, the desired communication configuration information;
receiving the requested communication configuration information over the communication link; and
configuring the access point in accordance with the received communication configuration information.

21. The method of claim 20, wherein
said communicating with a mobile wireless communication device utilizing a second communication protocol that is different from the first communication protocol comprises receiving a query from the mobile wireless communication device inquiring whether the access point is capable of communicating in accordance with the first communication protocol.

22. The method of claim 20, further comprising, identifying a source of the desired communication configuration information.

23. A wireless communication network access point comprising:
a wireless communication module operable in a plurality of communication signal processing configurations; and
at least one module operable to, at least:
determine communication configuration information desired for configuring the wireless communication module;
acquire the determined communication configuration information; and
configure the wireless communication module in accordance with the acquired communication configuration information
wherein the at least one module is operable to acquire the determined communication configuration information by, at least in part, operating to:
determine whether the desired communication configuration information is stored locally; and if the desired communication configuration information is not stored locally, then acquire the desired communication configuration information from a non-local source, and wherein the at least one module operates to acquire the desired communication configuration from a non-local source by, at least in part, operating to:
establish a communication link between the access point and the non-local source; and
communicate a request for the desired communication configuration information to the non-local source.

24. The wireless communication network access point of claim 23, wherein the desired communication configuration information corresponds to a communication protocol that the access point is not presently capable of communicating in accordance with.

25. The wireless communication network access point of claim 23, wherein:
the wireless communication network access point comprises a plurality of alternative modules that may be utilized for processing a communication signal; and
the communication configuration information comprises information selecting at least one module of the plurality of alternative modules that the access point is to utilize for processing a communicating signal.

26. The wireless communication network access point of claim 23, wherein:
the wireless communication network access point comprises at least one module adapted to process a communication signal in a plurality of ways; and
the communication configuration information comprises information indicating how the at least one module is to process a communication signal.

27. The wireless communication network access point of claim 23, wherein:
the wireless communication network access point comprises a processor adapted to execute software instructions; and
the communication configuration information comprises executable code to be executed by the processor.

28. The wireless communication network access point of claim 23, wherein the at least one module is adapted to determine communication configuration information desired for configuring the wireless communication module based, at least in part, on a communication received at the access point.

29. The wireless communication network access point of claim 28, wherein:
the communication is received utilizing a first communication protocol; and
the desired communication configuration information corresponds to a second communication protocol different from the first communication protocol.

30. The wireless communication network access point of claim 23, wherein the at least one module is adapted to acquire the determined communication configuration information by, at least in part, receiving unsolicited communication configuration information from a device communicatively coupled to the access point.

31. The wireless communication network access point of claim 23, wherein the communicated request comprises security information.

32. The wireless communication network access point of claim 23, wherein the communication configuration information comprises hardware setting information for the access point.

33. A wireless communication network access point comprising:
a wireless communication module operable in a plurality of communication signal processing configurations; and
at least one module operable to, at least:
determine communication configuration information desired for the access point, where the desired communication configuration information corresponds to a first communication protocol that the access point is not presently configured to communicate in accordance with, by at least in part operating to communicate with a mobile wireless communication device utilizing a second communication protocol that is different from the first communication protocol;
establish a communication link over which the desired communication configuration information may be obtained;
request, over the communication link, the desired communication configuration information;
receive the requested communication configuration information over the communication link; and
configure the access point in accordance with the received communication configuration information 34. The wireless communication network access point of claim 33, wherein the at least one module is operable to communicate with a mobile wireless communication device utilizing a second communication protocol that is different from the first communication protocol by, at least in part, operating to receive a query from the mobile wireless communication device inquiring whether the access point is capable of communicating in accordance with the first communication protocol.

* * * * *